United States Patent [19]

Cheng et al.

[11] 4,236,382

[45] Dec. 2, 1980

[54] SEPARATION OF AN AQUEOUS SOLUTION BY THE IMPROVED VACUUM FREEZING HIGH PRESSURE ICE MELTING PROCESS

[76] Inventors: Chen-Yen Cheng, 9605 La Playa St., NE., Albuquerque, N. Mex. 87111; Sing-Wang Cheng, Fourth Floor, No. 1 of Lane 479, Fu-Hsing N. Rd.,, Taipei, Taiwan; Wu-Cheng Cheng, 9605 La Playa St., NE., Albuquerque, N. Mex. 87111

[21] Appl. No.: 15,343

[22] Filed: Feb. 26, 1979

[51] Int. Cl.$^2$ .............................................. B01D 9/04
[52] U.S. Cl. ...................................... 62/537; 62/532; 62/123
[58] Field of Search .......................... 62/532, 537, 123

[56] References Cited

U.S. PATENT DOCUMENTS 3,690,116  9/1972  Cheng ..................................... 62/537

Primary Examiner—Norman Yudkoff

[57] ABSTRACT

In the Improved Vacuum-Freezing High Pressure Ice Melting Process, an aqueous solution is flash vaporized under a reduced pressure to simultaneously form a low pressure water vapor and ice crystals. The ice formed is first purified in a counter-washer and then melted inside of heat conductive conduits under a high pressure (e.g. 600 atm.) and the low pressure water vapor is desublimed to form desublimate (ice) on the outside of the conduits. The latent heat of desublimation released is utilized in supplying the heat needed in the ice-melting operation. The desublimate is removed intermittently by an in-situ dissolution operation utilizing an aqueous such as the feed solution or the concentrate; about an equivalent amount of ice is formed inside of the conduits by an exchange freezing operation. The ice so formed is also melted by the high pressure ice melting operation described. The process uses components that are available commercially and can be reliably operated. The process is highly energy efficient and cost competitive with other desalination processes and conventional evaporation processes. The process is useful in desalination of brackish water and sea water and in concentrating industrial aqueous solutions.

6 Claims, 6 Drawing Figures

Drawing 1

SEPARATION OF AN AQUEOUS SOLUTION BY THE IMPROVED VACUUM FREEZING HIGH PRESSURE ICE MELTING PROCESS

BACKGROUND OF THE INVENTION

1. Field of Invention

The process of the present invention is an improved vacuum freezing process that can be used in separating water from aqueous solutions. It is useful in desalination of brackish water and sea water and in concentrating industrial aqueous solutions. The major difficulties that a conventional vacuum freezing process has suffered from are related to the way the low pressure water vapor formed in a vacuum freezing zone is removed from the zone and the way it is transformed into a liquid state. The present invention introduces a new and convenient method of accomplishing these without first pressurizing the low pressure water vapor and without using a very concentrated aqueous solution, such as lithium bromide, as an absorbing solution. In the process, the low pressure water vapor is desublimed and the desublimate is removed by dissolving it into the feed solution or the product solution and ice is melted under a high pressure to remove the latent heat of desublimation. The process is highly energy efficient and can be operated simply and reliably.

2. Brief Description of the Prior Art

Several vacuum freezing processes have been introduced by workers in the desalination field. These processes are (1) Vacuum-Freezing Vapor-Compression (VFVC) Process developed by Colt Industries, (2) Vacuum-Freezing Vapor Absorption (VFVA) Process developed by Carrier Corporation, (3) Vacuum-Freezing Ejector-Absorption (VFEA) Process developed by Colt Industries, (4) Vacuum-Freezing Solid-Condensation (VFSC) Process developed in the Catholic University of America and (5) Vacuum-Freezing High Pressure Ice-Melting (VFPIM) Process introduced by Chen-yen Cheng and Sing-Wang Cheng. The process of the present invention is an improved process of the Vacuum Freezing High Pressure Ice Melting Process.

In any of the vacuum freezing processes described, an aqueous solution is introduced into a chamber which is maintained at a pressure that is somewhat lower than the vapor pressure of the solution at the freezing temperature of the solution to thereby simultaneously flash vaporize water and form ice crystals. As the results of this operation, a low pressure water vapor and an ice-mother liquor slurry are formed. In case of sea water desalination, this pressure is around 3.5 Torr. The low pressure water vapor formed has to be removed and transformed into a condensed state; the ice crystals have to be separated from the mother liquor and the resulting purified ice has to be melted to yield fresh water. Furthermore, the heat released in transforming the vapor into a condensed state has to be utilized in supplying the heat needed in melting the ice. The processes described utilize different ways of vapor removal, different ways of transforming the vapor into condensed states and different ways of accomplishing the heat reuse.

The Vacuum Freezing Vapor Compression Process is described in the Office of Saline Water, Research and Development Report No. 295. In the process, the low pressure water vapor is compressed to a pressure higher than the triple point pressure of water (4.8 Torr) and is then brought in direct contact with purified ice to thereby simultaneously condense the water vapor and melt the ice. The main disadvantages of this process are that the special compressor designed to compress the low pressure water vapor can not be operated reliably and the compressor efficiency is low.

The Vacuum Freezing Vapor Absorption Process was developed by Carrier Corporation up to 1964, but has been discontinued. The process is described in the Office of Saline Water, Research and Development Report No. 113. In the process, the low pressure water vapor is absorbed by a concentrated lithium bromide solution. The diluted solution is reconcentrated by evaporation and the water vapor so formed is condensed to become fresh water. Heat of absorption is removed by a recycling water stream through a heat transfer surface; the recycling water stream is then used to melt the ice crystals.

The Vacuum Freezing Ejector absorption Process was also developed by Colt Industries and is described in Office of Saline Water, Research and Development Report No. 744. In the process, the low pressure water vapor obtained in the freezing step is compressed by a combination of steam ejector and absorber loop. A concentrated sodium hydroxide solution is used to absorb a part of the low pressure vapor; the diluted sodium hydroxide solution is boiled to form water vapor at 300 Torr and regenerate the concentrated solution. In the ejector the water vapor is 300 Torr is used to compress the remaining low pressure water vapor.

The Vacuum-Freezing Solid-Condensation Process was developed by Professors H. M. Curran and C. P. Howard of the Catholic University of America and is described in Office of Saline Water, Research and Development Report No. 511. In the process, Freon-12 is used to remove the latent heat released in transforming the low pressure vapor into ice and supply the latent heat needed in the melting of both the ice formed in the freezing step and ice transformed from the low pressure water vapor.

The Vacuum Freezing High Pressure Ice Melting Process is described in U.S. Pat. No. 3,690,116. In the process, ice is melted inside of heat conductive conduits under a high pressure (e.g. 600 atm.) and low pressure water vapor is desublimed to form a desublimate (ice) layer on the outside surface of each conduit. The desublimate is mechanically removed from the wall. The desublimate (ice) so removed and the ice formed in the vacuum freezing operation are both melted by the high pressure ice-melting operation described.

It is noted that the improved vacuum freezing high pressure ice melting process of the present invention does not require (a) pressurization of the low pressure vapor, (b) the use of a very concentrated absorbing solution, such as lithium bromide or sodium hydroxide solution, and (c) a mechanical removal of a desublimate layer.

BRIEF DESCRIPTION OF THE INVENTION

A vacuum freezing process may be characterized by (a) the way the low pressure water vapor formed in the vacuum freezing zone is removed from the zone, (b) the way the vapor is transformed into a liquid state, and (c) the way the heat released in transforming the vapor into a condensed state is utilized in melting ice. The improved vacuum freezing high pressure ice melting process of the present invention comprises (a) a vacuum freezing step (Step 1), (b) an ice washing step (Step 2), (c) a simultaneous vapor desublimation and high pressure ice melting step (Step 3), and (d) a simultaneous desublimate dissolution and exchange ice formation step (Step 4).

During Step 1, an aqueous solution is flash vaporized in Zone 1 under a reduced pressure to form a low pressure water vapor and ice. During Step 2, the ice is separated from the mother liquor and purified in a counter washer. During Step 3, both the purified ice obtained in Step 2 and the ice obtained in Step 4 are melted inside of heat conductive tubes (Zone 2) under a high pressure and the low pressure water vapor obtained in Step 1 is transformed into desublimate (ice) that forms a thin desublimate layer on the outside of each tube (Zone 3). The latent heat released in the desublimiation of the water vapor is absorbed by the melting of ice. During Step 4, the inside of the tubes (Zone 2) is depressurized and an aqueous solution (B-solution), such as the feed solution or the product solution, is brought in contact with the desublimate layer in Zone 3. Heat flows from Zone 2 to Zone 3. As the results, the desublimate dissolves in the aqueous solution, and a nearly equivalent amount of ice is formed in the tubes. In this way the desublimate layer is simply removed without a mechanical scraping operation. The ice formed in Zone 2 during Step 4 provides the additional heat removing capacity needed in balancing the latent heat released in the desublimation of water vapor and the latent heat absorbed in the high pressure melting of ice during Step 3.

DESCRIPTION OF PREFERRED EMBODIMENT OF THE INVENTIONS

Figure 1:
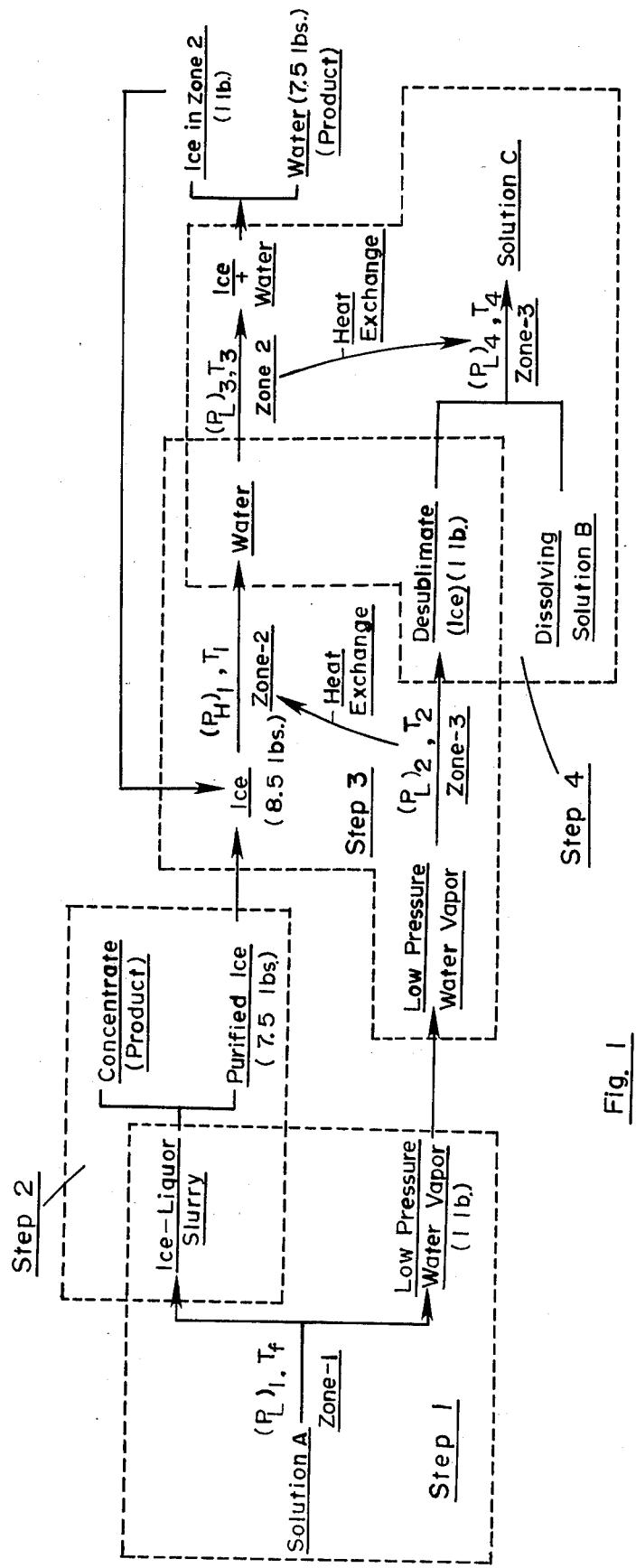
FIG. 1 shows a process flow sheet for the Improved Vacuum Freezing High Pressure Ice Melting Process incorporating vapor desublimation and in-situ desublimate dissolution operations.

FIG. 1 illustrates a process flow sheet of the improved vacuum freezing high pressure ice melting process. Referring to this figure, the process comprises the following four major steps:

Step 1. Vacuum Freezing Operation

During this step, a deaerated and precooled aqueous solution (A-solution) is flash vaporized under a sufficiently low pressure to cause freezing of the solution. As the results, the solution is transformed into a low pressure water vapor and an ice-mother liquor slurry. In this operation, water serves as the primary refrigerant to remove heat of freezing. Therefore, this step may also be referred to as a primary evaporative freezing operation.

Step 2. Ice Washing Operation

During this step, the ice crystals in the ice-mother liquor slurry obtained in step 1 are separated from the mother liquor and washed by a fresh water stream. A purified ice mass and a concentrated aqueous solution are obtained in this step. The concentrated solution may be heat exchanged with a feed solution and discharged as a product stream, or it may also be used as a dissolving solution (B-Solution) in Step 4. The purified ice is to be melted in Step 3. In order to facilitate transporting the ice, a liquid may be added to the ice and the mixture is agitated to form an ice-liquid slurry. It is very convenient to use water as the slurry-forming liquid. However, one may also use a water insoluble liquid as the slurry forming liquid.

Step 3. Vapor Desublimation and High Pressure Ice Melting Operations

High pressure ice melting and desublimation of the low pressure water vapor are conducted simultaneously and respectively at inside (Zone-2) and outside (Zone-3) of heat conductive conduits. Thus, fresh water is formed inside of the conduits and a desublimate (ice) deposit is formed on the outside of the conduits. It is noted that both the purified ice obtained in Step 2 and the ice formed in Step 4 are melted in this operation.

Step 4. In-Situ Desublimate Dissolution and Exchange Ice Melting Operations

During this step, an aqueous dissolving solution (B-Solution) is brought in contact with the desublimate mass and the conduits (Zone-2) are depressurized. The B-Solution dissolves the desublimate to become C-Solution and about an equivalent amount of ice is formed inside of the conduits. An aqueous solution of a proper freezing temperature may be used as the dissolving solution. However, it is most convenient either to use the feed solution or the concentrate obtained in Step 2 as the dissolving solution. In the former case, C-Solution is a diluted feed solution and is recycled to Step 1 as the A-Solution. In the latter case, feed solution is used as A-solution in Step 1 and C-Solution becomes a product stream.

It is noted that as the result of the in-situ desublimate dissolution operation, the desublimate is not recovered as product water. Therefore, only 7.5 lbs of product water is obtained per pound of water evaporated, rather than 8.5 lbs. This loss is well made up by the simplifications obtainable in the equipment and the plant operations.

The four operational steps described, some auxiliary operations, an integrated freezer-melter and its operations are described in the following sections.

1. Vacuum Freezing Operation

Figure 2:
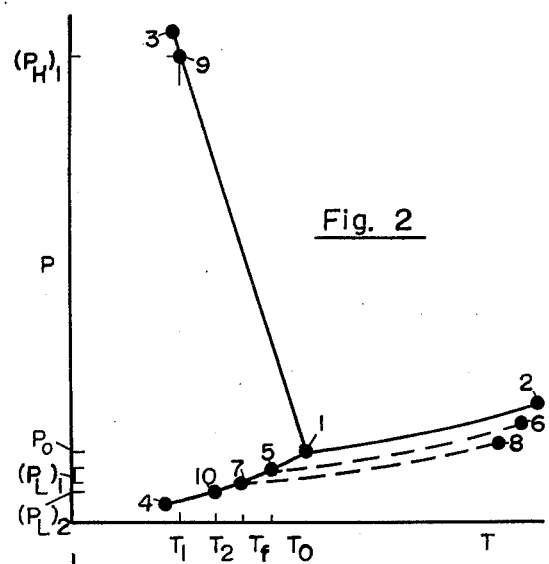
FIG. 2 schematically illustrates a phase diagram for pure water and aqueous solutions and illustrates key operating conditions for the vacuum freezing step (Step 1) and the simultaneous vapor desublimation and high pressure ice melting step (Step 3).

A vacuum freezing operation may be explained by referring to the phase diagram illustrated by FIG. 2. The figure illustrates the triple point of water 1, the vaporization line of water 1-2, the melting line of water 1-3, the sublimation line of water 1-4, the vaporization line of a first solution 5-6, the vaporization line of the second solution 7-8, the S-L-V three phase point of the first solution 5, and the S-L-V three phase point of the second solution 7. The triple point for a pure substance (point 1) is represented by the pressure and temperature at which the substance can simultaneously coexist as a liquid, vapor, and solid. The S-L-V three phase point for a saline solution (point 5 or 7) is represented by the pressure and temperature at which the solution coexists with ice and water vapor and is dependent on the concentration of the solution. The triple point of pure water (point 1) is at 32.018° F. ($T_0$) and 4.58 Torr ($P_0$) and the S-L-V three phase point of sea water (point 5) is at 28.3° F. and 3.87 Torr. As water is separated from an aqueous solution during a vacuum freezing operation, the S-L-V temperature and pressure come down gradually. When sea water is processed with a 33% recovery, the S-L-V point of the final solution (point 7) is at 26.4° F. and 3.53 Torr. In the following discussions, the S-L-V point and the vaporization line of sea water are respectively represented by point 5 and line 5-6 and the S-L-V point and the vaporization line of the concentrated sea water (33% recovery) are respectively represented by point 7 and line 7-8.

In an ideal operation, the condition prevailing in a vacuum freezer corresponds to the S-L-V point of the solution in the freezer. Therefore, in case of a back-mix freezer the condition corresponds to the S-L-V point of the discharge solution; in case of a multistage freezer, the conditions vary from the S-L-V point of feed solution to that of the discharge solution. When sea water is processed by an ideal operation in a back-mix type vacuum freezer with 33% recovery, the temperature $T_f$ and pressure $(P_L)_1$ prevailing in the freezer (point 7) are respectively 26.4° F. and 3.53 Torr. The water vapor formed in an actual operation is at a pressure slightly lower than this ideal freezer pressure and this vapor desublimes at pressure $(P_L)_2$ and Temperature $T_2$. This desublimation condition is represented by point 10 in the figure. $\Delta T_F$ which is defined as $T_f - T_2$ and $\Delta P_F$ which is defined as $(P_L)_1 - (P_L)_2$ may be regarded as the driving forces required for conducting the vacuum freezing operation. In a sea water desalination operation with 30% recovery, $T_2$ and $(P_L)_2$ are respectively about 25° F. and 3.3 Torr.

The ratio of the ice formation rate to the vapor formation rate is dependent upon the ratio of the latent heat of vaporization to the latent heat of fusion at the S-L-V point. Typically these are 1070 Btu/lb and 144 Btu/lb, respectively. Hence, approximately 7.5 pounds of ice are formed for every pound of vapor.

When a pool of aqueous solution is subjected to a low pressure, an evaporative freezing operation takes place only within a thin top layer. An evaporative freezing operation is prevented from taking place in a lower region because of the hydraulic pressure applied to it. Therefore, there are two ways of conducting this step: one is to spray liquid into space and the other is to use a multitude of shallow freezer trays.

2. Ice Washing Operation

A slurry of ice crystals and mother liquor is produced in a vacuum freezing operation. Ice particles formed by freezing an aqueous solution consist of practically pure water while the solute accumulates in the unsolidified liquid phase or brine. Before the ice crystals can be melted they must be separated from the brine. The brine adheres to the ice crystals by means of interfacial tension (which is about 20-30 dynes/cm). Since the ice crystals produced in the evaporative freezing operation are rather small, the total area of ice exposed to the brine is large and the surface tension forces are of major importance. Conventional methods used for the separation of crystals from their mother-liquor prove to be either too slow or too expensive for sea water conversion. To overcome the difficulties associated with surface tension forces a displacement process can be used in which the brine is displaced from the interstices of the ice crystals by a second liquid which has a surface tension nearly equal to that of the brine. In an actual water conversion process the clean product water can serve as the displacing liquid.

A counterwasher used by the Colt Industires is a vertical column provided with screens at midway between the top and bottom the column. In operation, an ice-brine slurry enters at the bottom of the column. The ice particles are carried upward by the stream of brine and further up the ice crystals consolidate into a porous plug which moves continuously upward by means of a pressure difference maintained across the plug. Excess brine drains through the screens. Wash water, under pressure, is introduced at the top of the column. Its velocity down the column with respect to the upper velocity of the ice plug is only that much above zero to compensate for the dispersion of the fresh water-brine interface. The purified ice is harvested at the top of the column, reslurrified with water or a water insoluble liquid and sent to Step 3 for a high pressure melting operation.

3. Vapor Desublimation in Zone-3 and High Pressure Ice-Melting in Zone-2

Figure 3:
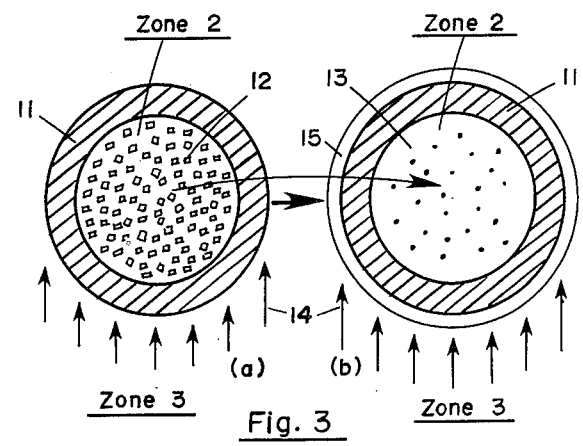
FIG. 3 illustrates the progress of a high pressure ice melting operation and a vapor desublimation operation taking place simultaneously and respectively inside (Zone 2) and outside (Zone 3) of the heat conductive wall of a high pressure conduit.

Referring to FIG. 1, Step 3 consists of two component operations that take place simultaneously. These two component operations are respectively a high pressure ice melting operation conducted in Zone-2 and a low pressure vapor desublimation operation that is conducted in Zone-3. Zone-2 is a zone confined within high pressure heat conducting walls and Zone-3 is the neighboring zone that surrounds the heat conducting walls. The two zones are in a heat exchange relation with each other and may be respectively subjected to a high pressure and a low pressure. At the start of Step 3, Zone-2 contains ice that is formed in Step 4. A quantity of the ice-liquid slurry from Step 2 is introduced into Zone-2 and the low pressure water vapor that is formed in Step 1 is introduced into Zone-3 at a low pressure $(P_L)_2$. Zone-2 is then subjected to a sufficiently high pressure $(P_H)_1$ such that the melting temperature of ice $T_1$ is lower than the desublimation temperature $T_2$ of the low pressure water vapor. The conditions of the desubliming water vapor and the high pressure melting ice are respectively illustrated by points 10 and 9 in FIG. 2. This simultaneous desublimation of vapor and melting or ice are further illustrated by FIG. 3. The figure shows that ice crystals 12 within the tube 11 are melted under the high pressure $(P_H)_1$ at temperature $T_1$, that is lower than the desublimation temperature $T_2$ of the low pressure water vapor. Therefore, the ice 12 has become water 13, and the water vapor 14 has become a layer of desublimate (ice) 15 on the outer surface of the tube.

Referring to FIG. 2, the high pressure ice melting temperature $T_1$ and the ideal freezer temperature $T_f$ are related by the following relation:

$$T_1 = T_f - \Delta T_F - \Delta T_M,$$

wherein the $\Delta T_F$ and $\Delta T_M$ are temperature driving forces required in Step 1 and Step 3 respectively. Knowing the high pressure melting temperature $T_1$, one can find the pressure to be applied from the melting curve of ice. The melting point versus pressure relation of water is available in the following reference:

Dorsey, N. E., "Properties of Ordinary Water —Substance" American Chemical Society Monograph Series No. 81, P.612, Reinhold Publishing Corp. (1940)

According to the reference, the melting points of water under 2000 psia, 4000 psia, 6000 psia, 8000 psia, and 10,000 psia are 30° F., 28° F., 26° F., 23.7° F., 21.5° F. respectively. For example, letting the brine in the freezer be 5.0% NaCl solution ($T_f$=26.7° F.), and $\Delta T_F$ and $\Delta T_M$ be 2° F., $T_1$ is 21.7° F. and $(P_H)_1$ is 8800 psia (600 atm.).

Since the heat released in the desublimation step is utilized in the high pressure melting of ice, the amount of ice melted and the amount of vapor desublimed are in the ratio of the latent heat of sublimation and the latent heat of freezing and are about in the ratio of 8.5 to 1. Since only 7.5 pounds of ice is formed per pound of water vapor formed in Step 1, the purified ice from Step 2 does not provide enough heat removal capacity for desubliming the water vapor in Step 3. There is a need to add one more pound of ice in Zone-2 to provide an adequate heat removal capacity for desubliming one pound of water vapor. This additional amount of ice needed is formed in Zone-2 during Step 4. To summarize, melting of both the purified ice from Step 2 and the ice formed in Zone-2 during Step 4 provides a nearly adequate heat removing capacity for desubliming water vapor during Step 3. Even with this approach, there is still a need for an auxiliary refrigeration to compensate for heat leakages and work inputs made to the system and maintain the processing system under a thermally balanced state.

The over all resistance to heat transfer in this step comprises the melting side resistance and the desublimation side resistance. The desublimation side resistance is small, because the desublimate layer grows slowly and because the desublimate (ice) layer has a high heat conductivity. It is noted that only one pound of desublimate is deposited as 1144 Btu of heat is transferred and that thermal conductivity of ice is $5.7 \times 10^{-3}$ cal/(sec.)(sq. cm)(°C/cm), which is about 4.42 times of that of water. The ultimate heat sinks on the melting side are the ice-water interfaces. Therefore, heat has to transfer from points on the inside wall to the nearby ice-water interfaces. The melting side resistance can be maintained at a low value by maintaining a substantial amount of ice in the zone during the melting operation. It is noted that 7.5 lbs of water are produced from the process as 1144 Btu of heat is transferred in this step. Therefore, the amount of heat transferred in this step to produce one pound of fresh water is 152.5 Btu.

4. In-Situ Desublimate Dissolution in Zone-3 and Exchange Ice Formation in Zone-2

Figure 4:
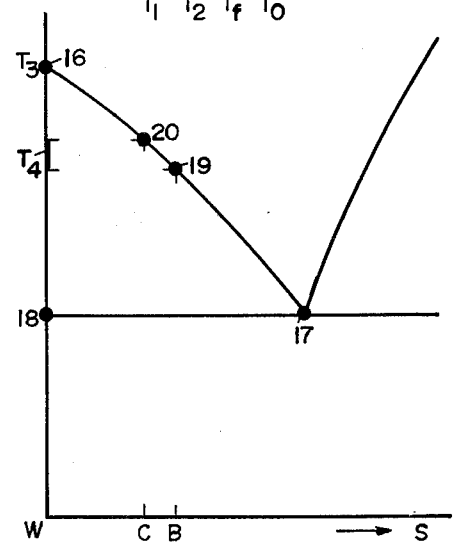
FIG. 4 schematically illustrates a binary phase diagram and illustrates key operating conditions for a simultaneous desublimate dissolution and exchange ice formation step (Step 4).

Referring to FIG. 1, Step 4 consists of two component operations that take place simultaneously. These two component operations are respectively an in-situ dissolution of desublimate into a dissolving solution (B-solution) in Zone-3 and an exchange ice formation in Zone-2 under a low pressure. On dissolving the desublimate, the dissolving solution is diluted and becomes C-solution. FIG. 4 schematically illustrates the normal pressure phase diagram of the binary system of the dissolving solution. It shows the freezing point of water $T_3$ 16, saturated liquid line in equilibrium with ice 16–17 and the eutectic line 17–18 under a normal pressure. The equilibrium conditions under which B-solution and C-solution co-exist with ice are respectively represented by points 19 and 20 in the figure. The temperature range $T_4$ between these conditions is lower than the freezing temperature of water $T_3$.

FIGS. 5a, 5b and 5c illustrate the progress of Step 4 operations. FIG. 5a illustrates the conditions inside (Zone-2) and outside (Zone-3) of a heat conductive conduit 21 at the begining of Step 4 operations. It shows that there is water inside 23 (Zone-2) and a desublimate layer 22 at the outside (Zone-3) of the conduit. Then the pressure inside the conduit (Zone-2) is reduced to a low pressure $(P_L)_3$ and a quantity of dissolving solution is brought into contact with the desublimate in Zone-3 under a low pressure $(P_L)_4$. Since the equilibrium temperature of ice-solution in Zone-3 is lower than the equilibrium temperature of ice-water in Zone-2, heat transfers from inside to outside and the following exchange crystallization operation takes place:

(water in Zone-2)+(ice and B-solution in Zone-3)→

(water and ice in Zone-2)+(C-solution in Zone-3)

Figure 5:
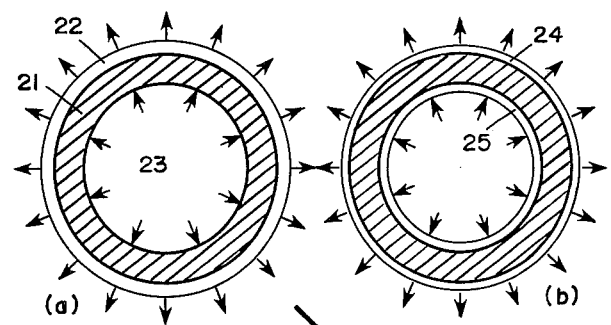
FIG. 5 illustrates the progress of an in-situ desublimate dissolution operation and an exchange ice formation operation taking place simultaneously and respectively outside (Zone 3) and inside (Zone 2) of the heat conductive wall of the high pressure conduit.

FIG. 5-b illustrates an intermediate condition at which Step 4 operations are in progress. It is seen that the desublimate layer 24 has become thinner and a layer of ice 25 is formed inside. FIG. 5-c illustrate the final condition of Step 4 operations. It shows that the desublimate layer has been removed and an approximately equivalent amount of ice 26 has been formed inside. One may purposely leave a thin ice layer outside at the conclusion of Step 4 operations in order to facilitate desublimate deposition in the following Step 3 operation.

One may use any aqueous solution as the dissolving solution. However, it is most convenient to use either a quantity of the feed solution or a quantity of the concentrate obtained in Step 2. In the former case, the C-Solution is a diluted feed solution, which may be used as A-Solution and be processed by Step 1 operation. In the latter case, the feed solution is used as A-solution and the C-Solution is discharged as the concentrated product of the process. The $\Delta t$ available for heat transfer in Step 4 is greater in the latter case than the former case and time taken in conducting Step 4 operations is consequently less in the latter case. However, the operational procedures for the former case are somewhat simpler than the latter case.

It is noted that the time taken in processing this step is very short, because the amount of heat to be transferred is small, the overall heat transfer coefficient is high and a substantial $\Delta t$ for heat transfer is available. These are explained as follows:

(1) Since 7.5 lbs of fresh water are produced per pound of desublimate formed, the amount of heat to be transferred in producing one pound of water is only equal to about 144/7.5=19.2 Btu (2) It is seen in FIG. 5-b that there is a layer of ice on the inside and a layer of ice outside of the conduit. Heat released at the ice-water interface inside is transmitted through the inside ice layer, through the metal wall and through the outside ice layer and finally is released at the ice-brine interface outside to supply the heat of dissolution. Having two ice layers adhering to the walls is very advantageous from the standpoint of heat transfer, because ice has a high thermal conductivity. The thermal conductivity of ice $k_{ice}$ is $5.7 \times 10^{-3}$ gr-cal/(sec)(cm$^2$)(°C/cm) and that of water $k_w$ is $1.29 \times 10^{-3}$ in the same unit. When the total thickness of the two layers of ice is less than 1 mm, the overall heat transfer coefficient is greater than 450 Btu/hr-ft$^2$°F.

(3) Referring to sea water desalination with 33% recovery, and assuming that feed water is used as the dissolving solution, its concentration changes only from 3.5% salt to about 3.3%. The brine concentration at the ice-brine interface is around 3% and the ice-brine interface temperature is around 29° F. The temperature difference between the ice-water interface inside and the ice-brine interface outside is about 3° F. When the concentrate obtained in Step 2 is used as the dissolving solution, this temperature difference is about 5° F.

5. Auxiliary Operations

Heat exchange operations and an air venting operation are important operations. The incoming feed solution is cooled in countercurrent heat exchangers by the outgoing concentrated solution and product water. In order to reduce work input in the process, it is essential to have efficient heat exchange operations so that the terminal temperature difference is very small. The presence of inert gas in the processing system affects both the evaporative freezing operation and the desublimation operation. Therefore, there is a need for an efficient air venting operation.

As has been described, purified ice obtained in Step 2 is reslurrified with a liquid such as water and the resulting ice slurry is introduced into the heat conductive conduits at the begining of Step 3 operations. During the high pressure ice melting operation, a liquid such as water has to be pumped into the zone inside of the conduits to compensate for the volume shrinkage associated with the ice-melting operation and keep the zone pressurized. This can be accomplished by using a high pressure liquid pump.

6. An Integrated Freezer-Melter and Its Operations

Figure 6:
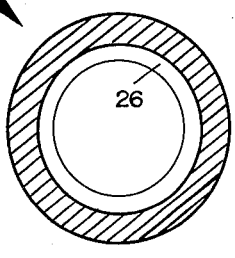
FIG. 6 illustrates an integrated freezer-melter in which steps 1, 3 and 4 of the present process can be conducted. Zones 1, 2 and 3 may be defined by referring to this figure and operating procedures will be described by referring to this figure.
Figure 6:
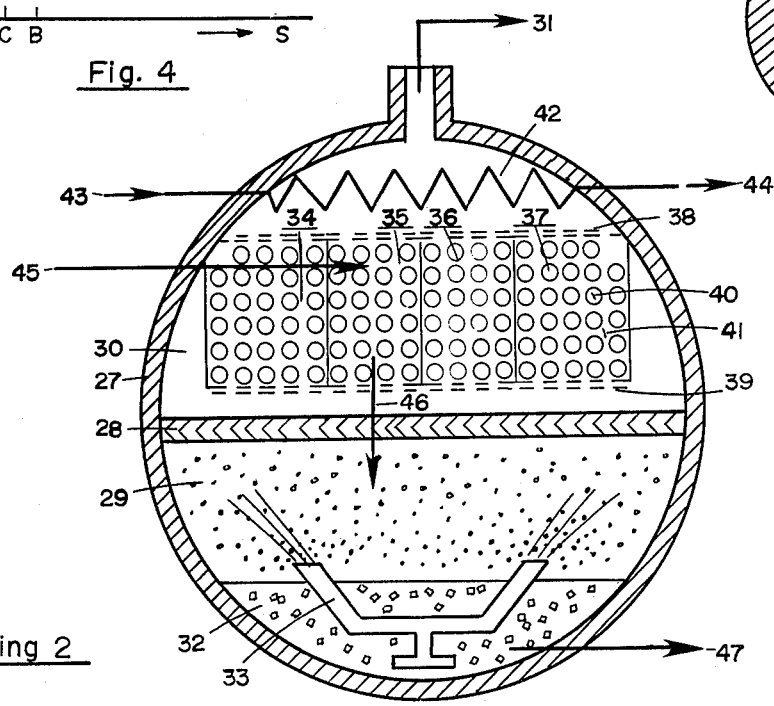

An integrated freezer-melter in which Step 1, Step 3 and Step 4 operations can be conducted is illustrated by FIG. 6. It comprises an insulated outer shell 27, a demister 28 which separates the interior of the shell into a lower region 29 that serves as an evaporative freezing zone (Zone-1) and an upper region 30, a vacuum conduit 31 connected to a vacuum pump, a pool of solution being processed 32, a freezer agitator 33 that throws the solution into the evacuated space, several compartmentized zones 34, 35, 36, 37, valving means 38, 39, high pressure heat conductive tubes in the compartmentized zones, and auxiliary cooling coils 42. The inside region and outside region of the high pressure tubes respectively serve as a high pressure ice-melting zone (Zone-2) 40, and a low pressure vapor desublimation zone (Zone-3) 41. A cooling medium 43, 44 is passed through the cooling coils.

Step 1 described is conducted in Zone-1 and the high pressure ice-melting operation and the vapor desublimation operation of Step 3 are respectively conducted in Zone-2 and Zone-3 of the unit. In Zone-1, the freezer agitator 33 is used to throw the aqueous solution into space to increase rates of vaporization and freezing. The demister 28 is used to prevent entrained liquid droplets from entering the desublimation zone. Since the unit is maintained at a temperature lower than the ambient temperature and since there are work inputs to the unit, there is a need for an auxiliary cooling to keep the system in a thermally balanced state. Refrigerant coils 42 for the auxiliary cooling are shown above the high pressure tubes.

It is seen that the high pressure tube region is compartmentalized 34, 35, 36, 37 and each compartment is provided with louver-type valving means 38, 39. Step 3 operations and Step 4 operations are alterntively conducted in each compartment. While Step 3 operations are conducted in a compartment, the valving means 38, 39 of the compartment are open to admit low pressure vapor into the compartment and an ice slurry is admitted to the tubes and the tubes are pressurized. While Step 4 operations are conducted in a compartment, the valving means of the compartment are closed to pressure isolate the space outside of the tubes (Zone-3) both from the evaporative freezing zone and the evacuating conduit, the tubes (Zone-2) are depressurized and a quantity of dissolving solution (B-Solution) is introduced to the space outside of the tubes. The desublimate is dissolved in the dissolving solution to become a C-Solution and ice in the amount of nearly equivalent to that of the dissolved desublimate is formed inside of the tubes. At the conclusion of Step 4, the C-Solution is removed from the compartment and the valving means are open to initiate Step 3 operations. When a quantity of the feed solution is used as the dissolving solution, the C-Solution formed is a diluted feed solution that may be added directly to the liquid pool in the evaporative freezing zone. Both the ice formed in Zone-2 during Step 4 and the ice in the ice slurry from Step 2 are melted by the high pressure ice-melting operation during Step 3.

7. Other Applications

In addition to desalination of sea water and brackish water and separation of industrial aqueous solutions, the improved vacuum freezing high pressure ice melting process may also be used in conditioning sludges and hydrophilic colloids, such as gelation, to facilitate dehydration operations. It is well known that when a sludge or a hydrophilic colloid is substantially completely frozen and melted, water can be separated from the conditioned sludge or conditioned colloid by a simple filtration operation. In such an application, the vacuum freezing step is so conducted that the mass discharged from the freezer is a substantially completely frozen mass and the mass is then slurrified, sent into heat conductive conduits and melted by the high pressure ice-melting operation. There is no need for the ice-washing step.

What we claim are:

1. A process of subjecting an aqueous mixture to freezing and melting operations that comprises:
    1. a first step of simutaneously flash vaporizing and freezing an aqueous mixture derived from the feed mixture (A-solution) in a first zone (Zone-1) under a reduced pressure to thereby form a low pressure water vapor and a mass of ice;
    2. a second step of simultaneously melting a mass of ice derived from the ice formed in Step 1 and the ice obtained in Step 3 in a second zone inside of a heat conductive conduit (Zone-2) and desublime the low pressure water vapor obtained in Step 1 in a third zone outside of the heat conductive conduit (Zone-3) to thereby simultaneously form a melt phase in the second zone and a desublimate in the third zone by (a) admitting the low pressure water vapor from Zone-1 to Zone-3 under a pressure lower than the triple point pressure of water, and (b) maintaining the ice under a sufficiently high pressure such that the melting temperature of the ice is lower than the desublimation temperature of water vapor, the heat released in the desublimation operation being utilized in the high pressure melting of ice;

3. a third step of simultaneously dissovling the desublimate in a dissolving solution (B-Solution) in Zone-3 and solidifying water in Zone-2 to thereby form a C-solution and ice in the two zones respectively by (a) pressure isolating Zone-3 from Zone-1, (b) bringing a quantity of the dissolving solution in contact with the desublimate in Zone-3, and (c) reducing the pressure in Zone-2 so that the freezing temperature in Zone-2 is higher than the dissolution temperature in Zone-3, the heat released in the freezing of water in Zone-2 being utilized in supplying the heat needed in dissolving the desublimate in Zone-3.

2. A process of claim 1, wherein Step 1 is so conducted that a part of the aqueous mixture remains unfrozen to thereby form an ice-mother liquor and further comprises a fourth step of separating the ice-mother liquor mixture to form a mass of purified ice and a concentrate, the purified ice becoming a part of the ice to be melted in the high pressure ice-melting operation of Step 2.

3. A process of claim 2, wherein the dissolving solution (B-solution) used in Step 3 is the feed solution itself.

4. A process of claim 3, wherein the C-solution obtained in Step 3 is used as the A-Solution in Step 1.

5. A process of claim 2, wherein the concentrate obtained in Step 4 is used as the dissolving solution (B-solution) in Step 3 and the feed solution is used as the A-Solution in Step 1.

6. An apparatus for subjecting an aqueous solution to vacuum freezing, high pressure ice-melting vapor desublimation and in-situ desublimate dissolution operations that comprises:

(a) a enclosure that withstands a vacuum condition, (b) a first and flash vaporization zone (Zone-1) inside the enclosure for simultaneously flash vaporizing and freezing an aqueous solution under a reduced pressure to thereby form a low pressure water vapor and a mass of ice, (c) at least a compartment in the remaining zone within the enclosure that excludes Zone-1, (d) valving means in each compartment for alternatively admitting the low pressure vapor from Zone-1 into the compartment and isolating the compartment from Zone-1, (e) multitude of high pressure heat conductive tubes in each compartment confining a second zone (Zone-2) within the tubes for alternatively melting ice under a high pressure and forming ice under a low pressure, (f) a third zone (Zone-3) in each compartment outside of the heat conductive tubes for alternatively desubliming the low pressure water vapor and dissolving the desublimate, the valving means being open and the tubes being pressurized while a vapor desublimation operation and a high pressure ice melting operation are respectively and simultaneously conducted in Zone-3 and Zone-2 of a compartment, and the valving means being closed and the tubes being depressurized while a desublimate dissolution operation and an ice formation operation are respectively and simultaneously conducted in Zone-3 and Zone-2 of a compartment.

* * * * *